US012518442B2

(12) United States Patent
Wehrly et al.

(10) Patent No.: US 12,518,442 B2
(45) Date of Patent: Jan. 6, 2026

(54) BI-DIRECTIONAL EXCHANGE OF EDITED VIRTUAL OBJECTS BETWEEN A DESIGN ENVIRONMENT AND A VIRTUAL ENVIRONMENT

(71) Applicant: Rec Room Inc., Seattle, WA (US)

(72) Inventors: Joshua Wehrly, Seattle, WA (US); Dan Kroymann, Bothell, WA (US); Robert El-Soudani, Seattle, WA (US); Matthew Johnson, Kirkland, WA (US)

(73) Assignee: Rec Room Inc., Seattle, WA (US)

( * ) Notice: Subject to any disclaimer, the term of this patent is extended or adjusted under 35 U.S.C. 154(b) by 148 days.

(21) Appl. No.: 18/523,386

(22) Filed: Nov. 29, 2023

(65) Prior Publication Data
US 2024/0177373 A1 May 30, 2024

Related U.S. Application Data

(60) Provisional application No. 63/385,365, filed on Nov. 29, 2022.

(51) Int. Cl.
G06T 11/00 (2006.01)
A63F 13/60 (2014.01)

(52) U.S. Cl.
CPC .............. *G06T 11/001* (2013.01); *A63F 13/60* (2014.09); *G06T 2200/24* (2013.01)

(58) Field of Classification Search
CPC .... A63F 13/60; G06T 11/001; G06T 2200/24

USPC .......................................................... 345/676
See application file for complete search history.

(56) References Cited

U.S. PATENT DOCUMENTS

2018/0001200 A1\* 1/2018 Tokgoz .................... A63F 13/52
2020/0139248 A1\* 5/2020 Sefcik ..................... A63F 13/60
2020/0306639 A1\* 10/2020 Karlsson ............... A63F 13/352

\* cited by examiner

*Primary Examiner* — Jacinta M Crawford
(74) *Attorney, Agent, or Firm* — Christensen O'Connor Johnson Kindness PLLC

(57) ABSTRACT

In some embodiments, a computer-implemented method of managing editing of virtual environment objects is provided. A computing system receives a first studio-version object created in a creation studio application executed by a designer computing device. The creation studio application is associated with a game engine. The computing system transmits a first binary object based on the first studio-version object to a virtual environment client computing device. The computing system receives a first VE editor object created in a virtual environment editor executed by the virtual environment client computing device. The first VE editor object includes at least a reference to the first binary object. The computing system creates a first studio-version VE editor object that includes at least a reference to the first studio-version object and the first VE editor object; and transmits the first studio-version VE editor object to the designer computing device.

20 Claims, 10 Drawing Sheets

BI-DIRECTIONAL EXCHANGE OF EDITED VIRTUAL OBJECTS BETWEEN A DESIGN ENVIRONMENT AND A VIRTUAL ENVIRONMENT

CROSS REFERENCE TO RELATED APPLICATION

This application claims the benefit of Provisional Application No. 63/385,365, filed Nov. 29, 2022, the entire disclosure of which is hereby incorporated by reference herein for all purposes.

TECHNICAL FIELD

This disclosure relates generally to virtual environments, and in particular but not exclusively, relates to designing virtual objects to be presented within virtual environments.

BACKGROUND

Virtual environments, including but not limited to virtual reality environments, augmented reality environments, two-dimensional game environments, and the like, are growing in popularity. One non-limiting example of a virtual environment is the shared virtual environment described in U.S. Pat. No. 10,874,943, the entire disclosure of which is hereby incorporated by reference herein for all purposes. Other examples of virtual environments abound, from multiplayer virtual reality environments presented by head-mounted devices, to multiplayer three-dimensional virtual environments presented by game consoles, mobile computing devices, desktop computing devices, or other computing devices, to two-dimensional virtual environments, or any other virtual environment that can be presented by a game engine.

SUMMARY

In some embodiments, a system is provided that comprises a designer computing device and a virtual environment client computing device. The designer computing device is configured to provide a creation studio application in which a designer user can create and modify studio-version objects that can be built into binary objects presentable in a virtual environment. The virtual environment client computing device is configured to provide a virtual environment editor in which an end user can create and modify virtual environment editor objects (VE editor objects) that reference binary objects. The designer computing device is further configured to: receive a studio-version VE editor object that includes information from a VE editor object created on the virtual environment client computing device and a reference to a binary object; determine a studio-version object corresponding to the reference to the binary object; and present the studio-version object in the creation studio application in a position and orientation within a scene as indicated by the studio-version VE editor object for editing of the scene.

In some embodiments, a computer-implemented method of managing editing of virtual environment objects is provided. A computing system receives a first studio-version object created in a creation studio application executed by a designer computing device. The creation studio application is associated with a game engine. The computing system transmits a first binary object based on the first studio-version object to a virtual environment client computing device. The computing system receives a first VE editor object created in a virtual environment editor executed by the virtual environment client computing device. The first VE editor object includes at least a reference to the first binary object. The computing system creates a first studio-version VE editor object that includes at least a reference to the first studio-version object and the first VE editor object; and transmits the first studio-version VE editor object to the designer computing device.

In some embodiments, a non-transitory computer-readable medium having computer-executable instructions stored thereon is provided. The instructions, in response to execution by one or more processors of a computing system, cause the computing system to perform a actions for managing editing of virtual environment objects, the actions comprising: receiving, by the computing system, a first studio-version object created in a creation studio application executed by a designer computing device, wherein the creation studio application is associated with a game engine; transmitting, by the computing system, a first binary object based on the first studio-version object to a virtual environment client computing device; receiving, by the computing system, a first VE editor object created in a virtual environment editor executed by the virtual environment client computing device, wherein the first VE editor object includes at least a reference to the first binary object; creating, by the computing system, a first studio-version VE editor object that includes at least a reference to the first studio-version object and the first VE editor object; and transmitting, by the computing system, the first studio-version VE editor object to the designer computing device.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1:
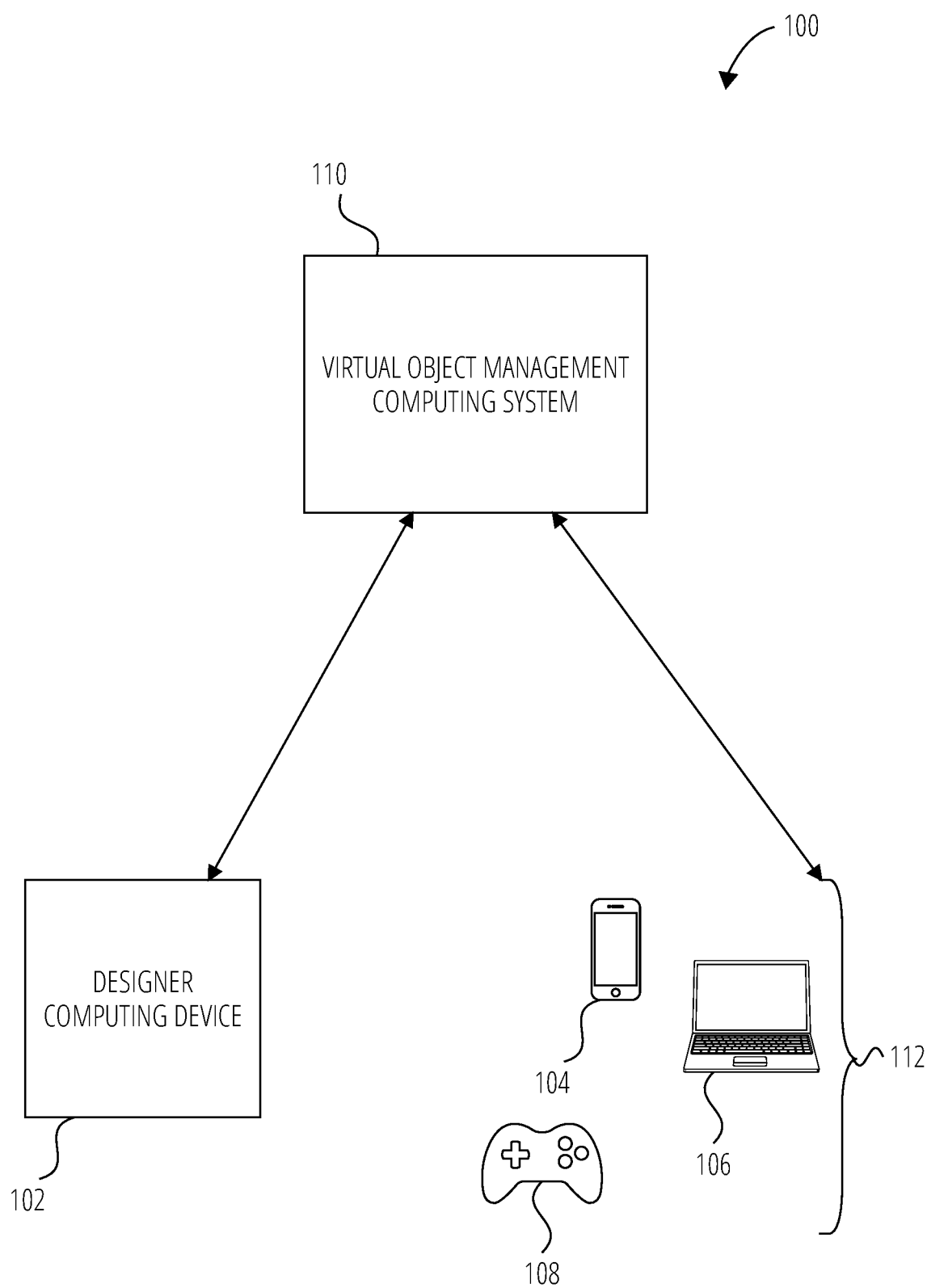
FIG. 1 is a schematic drawing of a system for bi-directional synchronization of edits to objects for presentation in a virtual environment according to various aspects of the present disclosure.

Typically, scenes and/or objects within scenes to be presented within the virtual environment are created in a creation studio application (e.g., Unity Editor) associated with a game engine, and the game engine is executed on virtual environment client computing devices to present the scenes. Some non-limiting examples of game engines include the Unity Engine, the Unreal Engine, the CryEngine, the id Tech engine, the Infinity engine, and the Genie Engine. Though the details differ, the overall concept of each game engine is similar: a creation studio application is used to design an in-studio version of objects to be presented in the virtual environment. The studio-version objects are editable in the creation studio application, and may be saved as studio-version objects for further editing within the creation studio application. The creation studio application allows highly detailed editing of objects and scenes, including adding textures, scriptable behaviors, and other characteristics of objects and scenes to be rendered by the corresponding game engine.

In order to increase efficiency of presentation of the virtual environment at run time, the studio-version objects undergo a "build" process that converts the studio-version objects into binary objects that can be loaded and executed by the game engine. In some embodiments, different binary objects may be created during the build process for the same studio-version object for different target platforms. That is, a first binary object may be created based on a first studio-version object to run on a game engine on a first platform, such as an iPhone, and a second binary object may be created based on the first studio-version object to run on a game engine on a second platform, such as an Oculus Rift system. Different binary objects may also be created for different versions of the same game engine (e.g., version 1.0.1 versus version 1.0.2 of the same game engine). Accordingly, in some embodiments a studio-version object may need to be re-built into an updated binary object if a different version of the game engine is to be targeted.

In some virtual environments, a virtual environment editor is provided. The virtual environment editor presents an interface within the virtual environment within which end users can construct virtual environment objects by combining and positioning primitive binary objects that were created within the creation studio application. Interfaces provided within the virtual environment are typically not as capable as interfaces provided by designer computing devices 102, and so the virtual environment editor will typically not provide as much functionality to edit primitive binary objects as is provided by the creation studio application. While the virtual environment editor may not allow the end user to edit features that have been built into primitive binary objects (e.g., textures, meshes, and/or vertices that define the binary object), the virtual environment editor may nevertheless allow the end user to adjust sizes, positions, and orientations of the primitive binary objects to create complex structures.

While providing a virtual environment editor can allow in-environment creation of rich content, there are nevertheless drawbacks. For example, current systems may allow creation of primitive objects within the creation studio application and assembly of virtual environment objects within the virtual environment editor, but current systems do not allow for the two-way synchronization of edits between the virtual environment editor and the creation studio application. That is, virtual environment objects created in the virtual environment editor cannot then be edited in the creation studio application, and then re-synchronized to the virtual environment. Providing two-way synchronization is desirable, at least because detailed edits to a scene created in the virtual environment editor could be made using the creation studio application, or the creation studio application could be used to adjust aspects of the objects created in the virtual environment editor that are not otherwise editable by the virtual environment editor.

Further, current systems do not allow for independent versioning of virtual environment objects and primitive binary objects—typically, a given virtual environment object will be frozen to specific versions of the primitive binary objects used therein. It would be desirable to allow for independent versioning of these objects, at least because it would allow the maximum amount of flexibility between designing within the virtual environment editor and the creation studio application, and would also allow changes to be made in either the virtual environment editor or the creation studio application without breaking scenes that used previous versions of the edited objects.

In some embodiments of the present disclosure, systems and techniques are provided that address these drawbacks by providing two-way synchronization of edited content between a creation studio application and a virtual environment editor. In some embodiments, independent versioning of virtual environment objects and binary objects is also provided to allow roll-back to any combination of virtual environment objects and binary objects.

FIG. 1 is a schematic drawing of a system for bi-directional synchronization of edits to objects for presentation in a virtual environment according to various aspects of the present disclosure.

As illustrated, the system 100 includes a designer computing device 102, a virtual object management computing system 110, and a plurality of virtual environment client computing devices 112. The designer computing device 102 may be any type of computing device capable of executing a creation studio application (e.g., Unity Editor or another creation studio application), including but not limited to a desktop computing device, a laptop computing device, a tablet computing device, and a mobile computing device. In some embodiments, more than one designer computing device 102 may be present in the system 100.

The virtual environment client computing devices 112 may include any type of computing device capable of executing a game engine (e.g., the Unity module or another game engine) associated with the creation studio application of the designer computing device 102. As illustrated, the virtual environment client computing devices 112 include a plurality of virtual environment computing devices that include a smartphone 104, a laptop computing device 106, and a game console 108 to illustrate that the game engine may be executable on a variety of different types of computing devices. Though not illustrated, the virtual environment client computing devices 112 may also include head-mounted virtual reality devices, including but not limited to the Quest device from Meta, the Vive Pro device from HTC, or the Index device from Valve. In some embodiments, only a single type of virtual environment client computing device 112 may be present in the system 100, or multiple virtual environment client computing devices 112 of a given type may be present.

The virtual object management computing system 110 is a computing system that is configured to receive studio-version objects created within the creation studio application on the designer computing device 102, use the studio-version objects to build binary objects targeting each of the different types of virtual environment client computing devices 112, and to distribute the binary objects to the virtual environment client computing devices 112. The virtual object management computing system 110 is also configured to receive virtual environment objects from the virtual environment client computing devices 112, and to help translate them back into studio-version objects to be edited by the designer computing device 102. In some embodiments, the virtual object management computing system 110 is also configured to manage versioning of the various parts of the virtual environment objects as described in further detail below.

Figure 2:
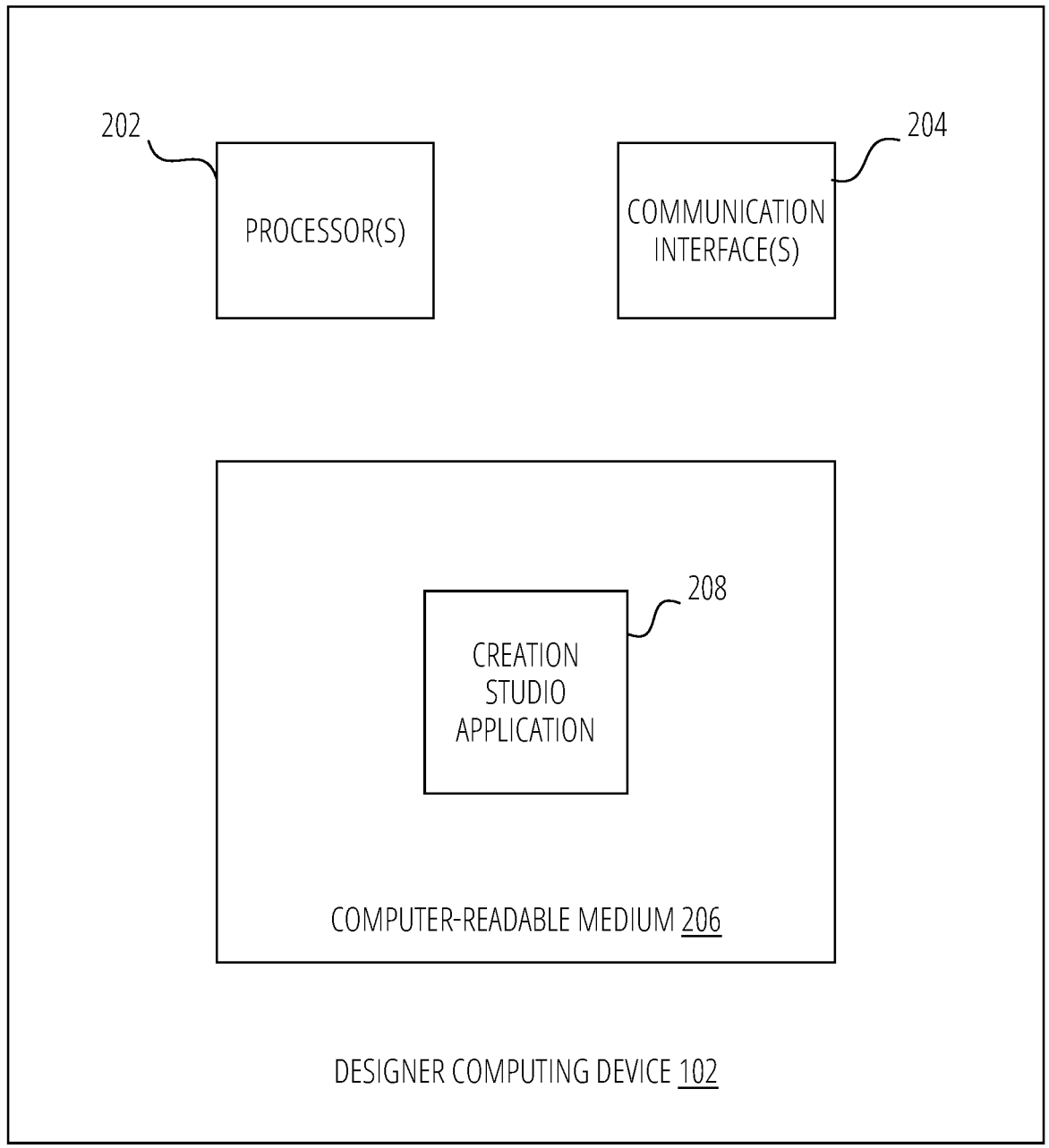
FIG. 2 is a block diagram that illustrates aspects of a non-limiting example embodiment of a designer computing device according to various aspects of the present disclosure.

FIG. 2 is a block diagram that illustrates aspects of a non-limiting example embodiment of a designer computing device according to various aspects of the present disclosure. The illustrated designer computing device 102 may be implemented by any computing device or collection of computing devices, including but not limited to a desktop computing device, a laptop computing device, a mobile computing device, a server computing device, a computing device of a cloud computing system, and/or combinations thereof, though typically the designer computing device 102 is provided in a form factor that allows for extensive and detailed user input, such as a form factor having input devices that include a keyboard and mouse. The designer computing device 102 is configured to enable a designer to create primitive objects using a creation studio application, to publish them to be presented within a virtual environment, and to virtual environment objects created within the virtual environment out of the primitive objects.

As shown, the designer computing device 102 includes one or more processors 202, one or more communication interfaces 204, and a computer-readable medium 206.

In some embodiments, the processors 202 may include any suitable type of general-purpose computer processor. In some embodiments, the processors 202 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 204 include one or more hardware and or software interfaces suitable for providing communication links between components of the system 100. The communication interfaces 204 may support one or more wired communication technologies (including but not limited to Ethernet, Fire Wire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 206 has stored thereon logic that, in response to execution by the one or more processors 202, cause the designer computing device 102 to provide a creation studio application 208.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the creation studio application 208 is an application configured to provide an interface to allow a designer to create and edit studio-version objects to be built into binary objects and presented within a virtual environment provided within a game engine. The creation studio application 208 is also configured to edit studio-version VE editor objects. The creation studio application 208 may be paired with a particular game engine. As a non-limiting example, Unity Editor may be used as a creation studio application 208 for the Unity game engine to be executed on virtual environment client computing devices 112.

Further description of the configuration of each of these components is provided below.

Figure 3:
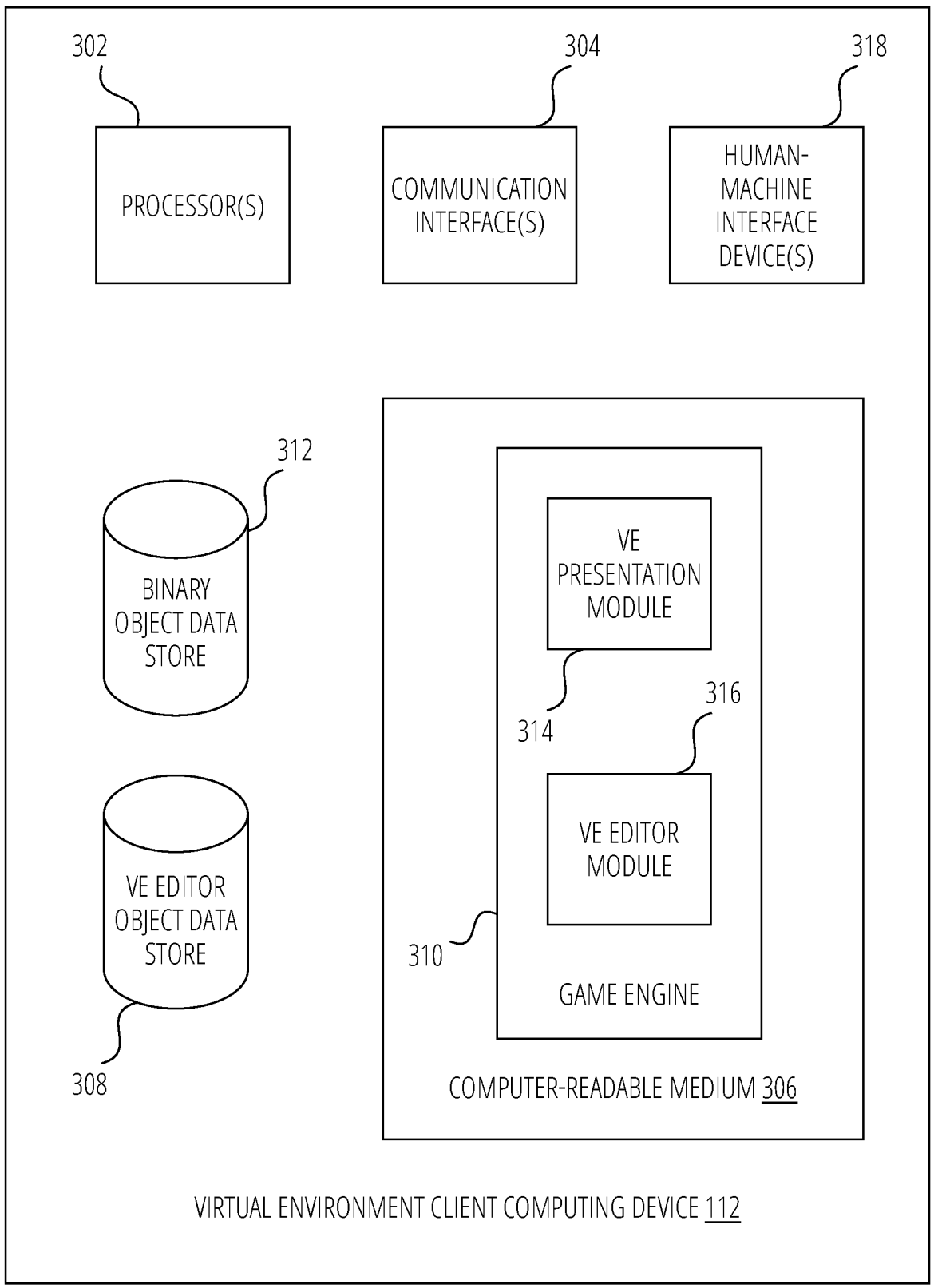
FIG. 3 is a block diagram that illustrates aspects of a non-limiting example embodiment of a virtual environment client computing device according to various aspects of the present disclosure.

FIG. 3 is a block diagram that illustrates aspects of a non-limiting example embodiment of a virtual environment client computing device according to various aspects of the present disclosure. The illustrated virtual environment client computing device 112 may be implemented by any computing device or collection of computing devices, including but not limited to a desktop computing device, a laptop computing device, a mobile computing device, a server computing device, a computing device of a cloud computing system, a head-mounted augmented reality or virtual reality (AR/VR) system, and/or combinations thereof. The virtual environment client computing device 112 is configured to present the virtual environment to an end user, including binary objects built from studio-version objects created on the designer computing device 102. The virtual environment client computing device 112 is also configured to present a virtual environment editor within the virtual environment in which an end user can create VE editor objects out of primitive binary objects as discussed in further detail below.

As shown, the virtual environment client computing device 112 includes one or more processors 302, one or more communication interfaces 304, one or more human-machine interface devices 318, a VE editor object data store 308, a binary object data store 312, and a computer-readable medium 306.

In some embodiments, the processors 302 may include any suitable type of general-purpose computer processor. In some embodiments, the processors 302 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 304 include one or more hardware and or software interfaces suitable for providing communication links between components of the system 100. The communication interfaces 304 may support one or more wired communication technologies (including but not limited to Ethernet, Fire Wire, and USB), one or more wireless communication technologies (including but not limited to Wi-Fi, WiMAX, Bluetooth, 2G, 3G, 4G, 5G, and LTE), and/or combinations thereof.

In some embodiments, the human-machine interface devices 318 may include one or more of any type of device through which a human may exchange information with the virtual environment client computing device 112. Human-machine interface devices 318 may include output devices such as visual display devices (e.g., LCD display devices, LED display devices, CRT display devices, or other types of display devices), audio display devices (e.g., loudspeakers, headphones, or other types of audio display devices), haptic display devices (e.g., vibration devices, force feedback devices, air vortex ring devices, ultrasound devices, or other types of haptic display devices), or other types of output devices. Human-machine interface devices 318 may include input devices such as keyboards, mice, buttons, microphones, touch-sensitive interface devices, gesture detection devices (e.g., depth sensors, cameras, accelerometers, or other types of gesture detection devices), or other types of input devices. In some embodiments, human-machine interface devices 318 may include combination devices, such as a head-mounted device that includes at least visual display devices, motion tracking devices, and headphones to produce an immersive virtual reality or augmented reality experience, and/or handheld controllers that include buttons and motion tracking tracking devices to accept input in the context of the virtual reality or augmented reality environment.

As shown, the computer-readable medium 306 has stored thereon logic that, in response to execution by the one or more processors 302, cause the virtual environment client computing device 112 to provide a game engine 310. One non-limiting example of a game engine 310 is the Unity Engine, though in other embodiments, other game engines may be used.

In some embodiments, the game engine 310 is configured to provide a VE presentation module 314 and a VE editor module 316. In some embodiments, the VE presentation module 314 is configured to provide a virtual environment within which a user is presented and may interact with virtual objects. In some embodiments, the VE editor module 316 is configured to present a virtual environment editor that allows a user to create and edit virtual objects to be presented within the virtual environment. In some embodiments, the virtual environment editor is presented by the VE editor module 316 within the virtual environment provided by the VE presentation module 314. In some embodiments, the virtual environment editor provided by the VE editor module 316 is separate from the virtual environment provided by the VE presentation module 314. The VE presentation module 314 and the VE editor module 316 are described as separate modules in the present disclosure to clearly state that these two functionalities are provided by the virtual environment client computing device 112, but in some embodiments, the virtual environment and the virtual environment editor may be provided by the same module.

As used herein, "module" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. A module may be compiled into executable programs or written in interpreted programming languages. Software modules may be callable from other modules or from themselves. Generally, the modules described herein refer to logical modules that can be merged with other modules, or can be divided into sub-modules. The modules can be implemented by logic stored in any type of computer-readable medium or computer storage device and be stored on and executed by one or more general purpose computers, thus creating a special purpose computer configured to provide the module or the functionality thereof. The modules can be implemented by logic programmed into an application-specific integrated circuit (ASIC), a field-programmable gate array (FPGA), or another hardware device. Further, modules illustrated as being present on or provided by one component of the system 100 may be present on or provided by a different component of the system 100, or by multiple components of the system 100 working together to provide the described functionality, unless otherwise stated herein.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Further description of the configuration of each of these components is provided below.

Figure 4:
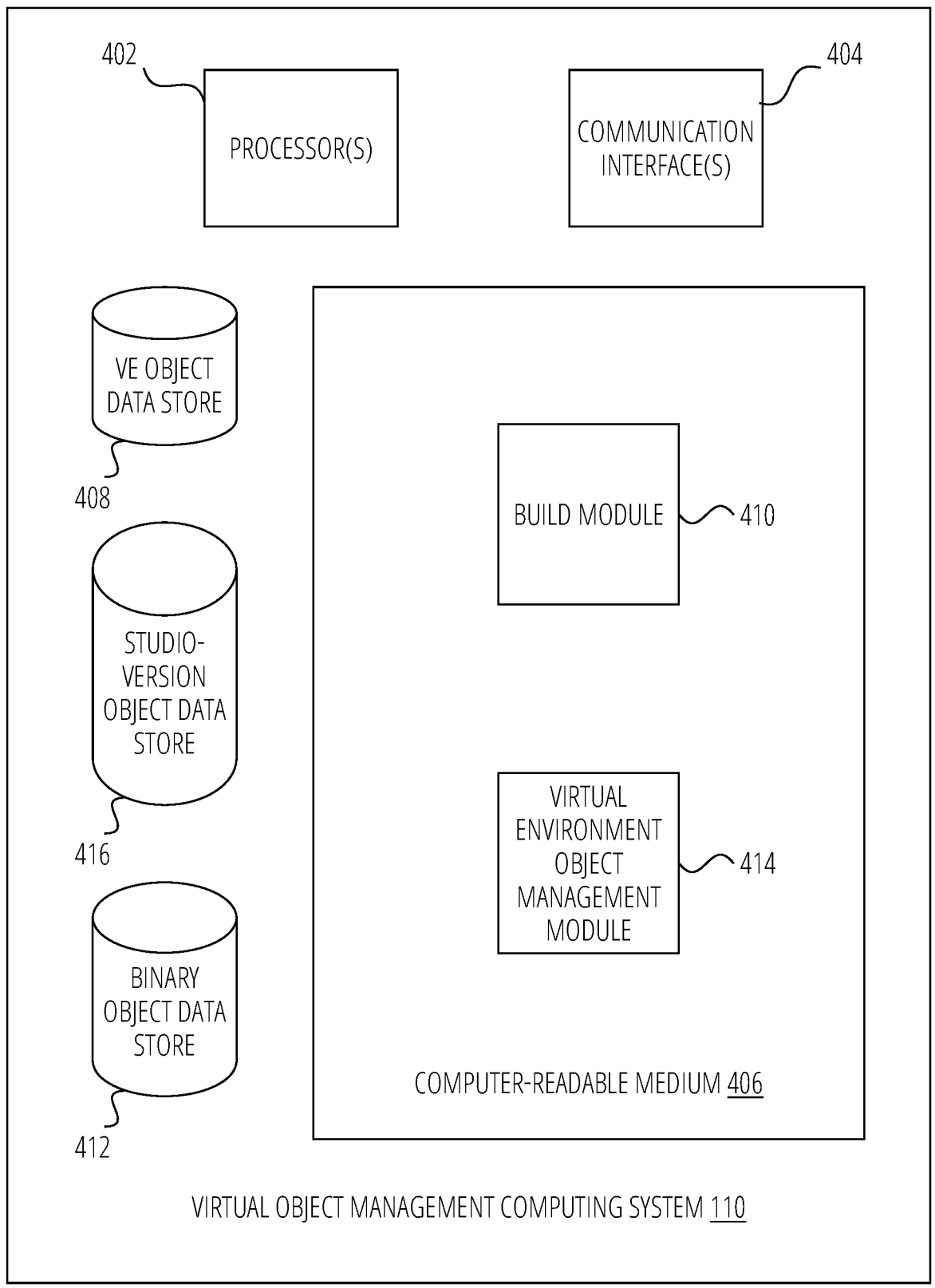
FIG. 4 is a block diagram that illustrates aspects of a non-limiting example embodiment of a virtual object management computing system according to various aspects of the present disclosure.

FIG. 4 is a block diagram that illustrates aspects of a non-limiting example embodiment of a virtual object management computing system according to various aspects of the present disclosure. The illustrated virtual object management computing system 110 may be implemented by any computing device or collection of computing devices, including but not limited to a desktop computing device, a laptop computing device, a mobile computing device, a server computing device, a computing device of a cloud computing system, and/or combinations thereof. The virtual object management computing system 110 is configured to receive studio-version objects from designer computing devices 102, to build binary objects based thereon, and to distribute the binary objects to virtual environment client computing devices 112. The virtual object management computing system 110 is also configured to receive VE editor objects from virtual environment client computing devices 112 and to store versioning information for the VE editor objects and the binary objects included therein. The virtual object management computing system 110 is further configured to create studio-version VE editor objects based on the VE editor objects to provide the capability of bi-directional syncing of edits to VE editor objects between designer computing devices 102 and virtual environment client computing devices 112.

As shown, the virtual object management computing system 110 includes one or more processors 402, one or more communication interfaces 404, a VE object data store 408, a binary object data store 412, a studio-version object data store 416, and a computer-readable medium 406.

In some embodiments, the processors 402 may include any suitable type of general-purpose computer processor. In some embodiments, the processors 402 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 404 include one or more hardware and or software interfaces suitable for providing communication links between components of the system 100. The communication interfaces 404 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 406 has stored thereon logic that, in response to execution by the one or more processors 402, cause the virtual object management computing system 110 to provide a build module 410 and a virtual environment object management module 414.

In some embodiments, the build module 410 is configured to receive studio-version objects from the designer computing device 102, to store the studio-version objects in the studio-version object data store 416, to build binary objects based on the studio-version objects associated with each target platform in the virtual environment client computing devices 112, to store the binary objects in the binary object data store 412, and to distribute the binary objects amongst the virtual environment client computing devices 112. In some embodiments, the virtual environment object management module 414 is configured to receive VE editor objects from virtual environment client computing devices 112, to store the VE editor objects in the VE object data store 408 along with versioning information for both the VE editor objects and the binary objects included therein, and to create studio-version VE editor objects based on the VE editor objects for editing on the designer computing device 102.

Further description of the configuration of each of these components is provided below.

Figure 5A:
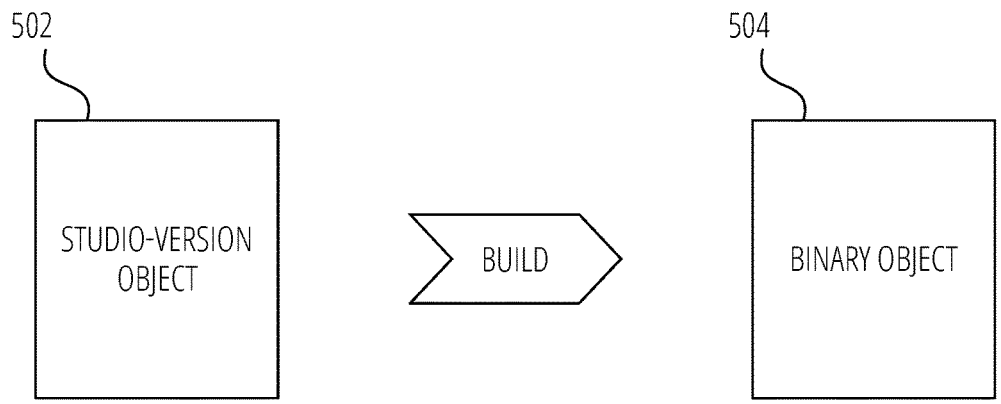
FIG. 5A-FIG. 5C are schematic illustrations of information flow within the system according to various aspects of the present disclosure.
Figure 5B:
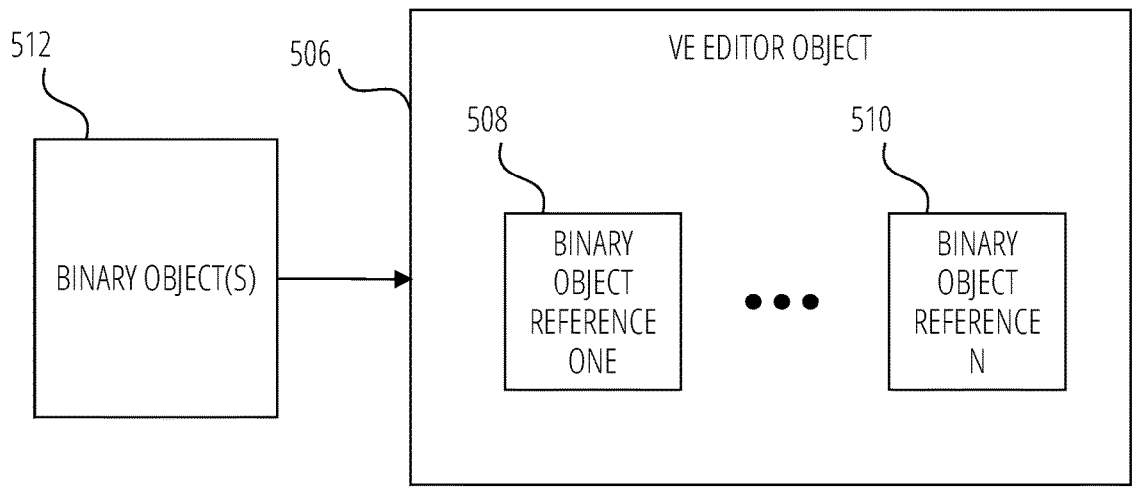
Figure 5C:
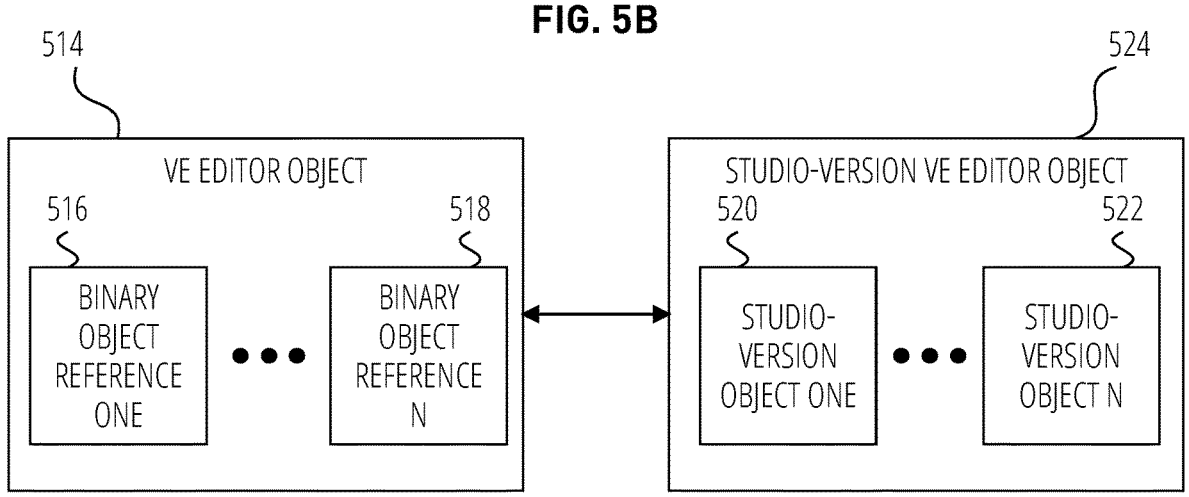

FIG. 5A-FIG. 5C are schematic illustrations of information flow within the system according to various aspects of the present disclosure.

FIG. 5A illustrates the design and creation of a binary object according to various aspects of the present disclosure. A user of a designer computing device 102 uses a creation studio application to create a studio-version object 502. The studio-version object 502 specifies detailed features of an object to be presented in the virtual environment, including but not limited to one or more of a set of vertices; a mesh; a position, location, and/or scale of the studio-version object 502 within a scene; an asset associated with the object (e.g., a texture, an audio file, etc.); a simulated physical property (e.g., collision behaviors, articulations, joints, etc.); a behavioral property (e.g., is this object solid/does this object cause collisions; motion vectors; animations; etc.); a behavior script; or a shader. The studio-version object 502 may be in a format that can be created, saved, and modified within the creation studio application 208, but that is not executable at run time by the game engine 310.

As shown, the build process performed by the build module 410 creates a binary object 504 based on the studio-version object 502. The binary object 504 is a condensed representation of the settings, assets, and other aspects of the studio-version object 502 that is in a format that is executable at run time by the game engine 310. Typically, the binary object 504 cannot be edited by the creation studio application 208 after it has been built. The creation of a binary object 504 allows the game engine 310 to efficiently present the object on a specific hardware platform. To achieve this, for a single studio-version object 502, separate binary objects 504 are built for each targeted hardware platform. The binary object 504 is then transmitted to virtual environment client computing devices 112 for presentation by the game engine 310.

FIG. 5B illustrates the creation of a virtual environment editor object, or "VE editor object," according to various aspects of the present disclosure. The virtual environment includes a virtual environment editor provided by the VE editor module 316 that allows users within the virtual environment to create content for presentation within the virtual environment.

The content is created by combining one or more primitive objects—which are embodied by binary objects 512—in new configurations. In some embodiments, the combining may include indicating relative positions of the binary objects 512 to each other, either by associating connection points of the separate binary objects 512, by otherwise specifying relative positions of the separate binary objects 512 with respect to each other, or via any other suitable technique. As a non-limiting example, a user may create a VE editor object 506 such as a table by combining a rectangular primitive binary object 512 for the tabletop with four cylindrical primitive binary objects 512 for the legs. This basic example is provided for the sake of simplicity, and it will be appreciated that this simple functionality can be used to combine any number of binary objects 512 of any type to create VE editor objects 506 of extreme complexity. Further, in some embodiments, simple objects may be created within the virtual environment editor and added to the VE editor object without being based on a binary object 512, such as simple geometric shapes, doodles, text, or other simple objects.

In some embodiments, the combining may include associating scripted behavior of the binary objects 512 with each other. A scripted method exposed by a first binary object 512 may be associated with a scripted event exposed by a second binary object 512. As a non-limiting example, a scripted method of a first binary object 512 that causes the first binary object 512 to move may be connected to a collision event of a second binary object 512. Again, this basic example is provided for the sake of simplicity, and it will be appreciated that this simple functionality can be used to combine any number of binary objects 512 of any type to create VE editor object 506 of extreme complexity.

To create a virtual environment object to be presented in the virtual environment, a user can create a VE editor object 506 within the virtual environment editor provided by the VE editor module 316. The VE editor object 506 is the editable and storable representation of the combined object to be presented in the virtual environment (typically read-write), and the virtual environment object is the combined object to be presented itself (typically read-only). The VE editor object 506 includes references to one or more binary objects 512 that represent building block primitive objects, such as binary object reference one 508 and binary object reference N 510. Though two binary object references are illustrated, one will recognize that any number of binary object references may be present. When the virtual environment object is presented, each of the binary object references 508-510 is used to load an appropriate binary object 512, and each binary object 512 is presented using parameters defined by the VE editor object 506 as described below.

Each binary object reference 508-510 points to a specific version of a binary object 512, and includes parameters to indicate how the referenced binary object 512 should be included in the virtual environment object. These parameters include, but are not limited to, a position, an orientation, and a scale. In some embodiments, the parameters may also include one or more of a simple interactive behavior setting (e.g., is the binary object 512 grabbable or collidable when presented as part of the virtual environment object) or an indication of a generic shader selected from a list of supported generic shaders to be applied when the binary object 512 is presented as part of the virtual environment object. The generic shaders may be translated by the game engine 310 to specific shaders supported by the current version of the game engine 310. As discussed above, the parameters may also include associations between scripted events and/or methods of the binary objects 512.

Compared to a studio-version object, the VE editor object 506 is a greatly simplified and condensed, in that it supports a limited number of customizations of how a pre-built binary object 512 will be presented. The use of references to binary objects and the limited number of customizations available provide several technical benefits: For example, the storage space required for a VE editor object 506 is greatly reduced, since it does not store textures, meshes, and other components that make up the binary object 512, but instead merely references them along with the limited parameters for adjusting the presentation. As another example, since the VE editor object 506 merely references one or more binary objects 512, the VE editor object 506 (and the associated virtual environment object) can work cross-platform, such that when it is opened by a game engine 310 on a different platform than the platform on which it was created, the appropriately built binary objects 512 may be loaded for the executing platform. As still another example, the lightweight editing supported by the VE editor object 506 is more suitable for editing within some virtual environments, such as a virtual reality environment or other three-dimensional virtual space, since more detailed editing controls may be difficult to implement within the user interface and using the available human-machine interface devices 318 of the virtual environment client computing devices 112.

While the lightweight VE editor object 506 is particularly appropriate for use within the virtual environment editor, there may be situations where the richer editing functionality of the creation studio application 208 may be desired to adjust the virtual environment object. FIG. 5C illustrates the synchronization of a VE editor object back to the creation studio application so that it may be edited further within the creation studio application.

As shown, the VE editor object 514 to be synchronized includes a set of binary object references 516-518, which again may be any number of binary object references. The VE editor object 514 is then converted into a corresponding studio-version VE editor object 524. In some embodiments, the studio-version VE editor object 524 may be created by the virtual object management computing system 110 and transmitted to the designer computing device 102. In some embodiments, the VE editor object 514 may be transmitted to the designer computing device 102, and the designer computing device 102 may create the studio-version VE editor object 524.

To create the studio-version VE editor object 524, each of the binary object references 516-518 is reviewed to determine an associated studio-version object that was used to build the referenced binary object. As shown, binary object reference one 516 was built using studio-version object one 520, and binary object reference N 518 was built using studio-version object N 522, and so studio-version object one 520 and studio-version object N 522 are added to the studio-version VE editor object 524 using the parameters (e.g., the position, orientation, scale, and/or other parameters) specified in the VE editor object 514.

The studio-version VE editor object 524 is then loaded by the creation studio application 208, and a designer edits the studio-version VE editor object 524 in various ways supported by the creation studio application 208. In some embodiments, editing of the studio-version VE editor object 524 enabled by the creation studio application 208 may be limited to changes that can be represented within the VE editor object 514. For example, the creation studio application 208 may allow editing of the studio-version VE editor object 524 and the components thereof that correspond to parameters stored in the VE editor object 514 (e.g., position, orientation, scale, and other parameters). As another example, the creation studio application 208 may allow adding new studio-version objects to the studio-version VE editor object 524, and adjusting the parameters for the new studio-version objects. As yet another example, the creation studio application 208 may allow removing studio-version objects from the studio-version VE editor object 524. In some embodiments, editing of the studio-version VE editor object 524 may include editing of the studio-version objects themselves (e.g., the assets, meshes, behaviors, etc, of the referenced studio-version objects) using the full-featured editing capabilities of the creation studio application 208 that were originally used to create the studio-version objects.

Once the edits to the studio-version VE editor object 524 have been completed, the studio-version VE editor object 524 is converted back into a VE editor object 514 for transmission to the virtual environment client computing devices 112, and subsequent presentation of the virtual environment object or subsequent further editing of the VE editor object 514 within the virtual environment editor. As above, in some embodiments, the VE editor object 514 may be updated by the designer computing device 102 before transmission to the virtual environment client computing devices 112 or the virtual object management computing system 110, and in some embodiments, the VE editor object 514 may be updated by the virtual object management computing system 110.

In some embodiments, the parameters of the VE editor object 514 that map directly to parameters adjusted in the studio-version VE editor object 524 (e.g., position, orientation, scale, and other parameters associated with the binary object references or the VE editor object 514 as a whole) are adjusted accordingly. In some embodiments, if changes to the studio-only parameters of the studio-version objects 520-522 were made, or new studio-version objects were added to the studio-version VE editor object 524, then new binary objects may be built for the edited/added studio-version objects (as illustrated in FIG. 5A), and binary object references to the edited/new binary objects will be added to (or updated in) the VE editor object 514.

These conversions between VE editor objects 514 and studio-version VE editor objects 524 allow for the two-way synchronization of edits between the creation studio application on the designer computing device 102 and the virtual environment editor on the virtual environment client computing devices 112.

Figure 6A:
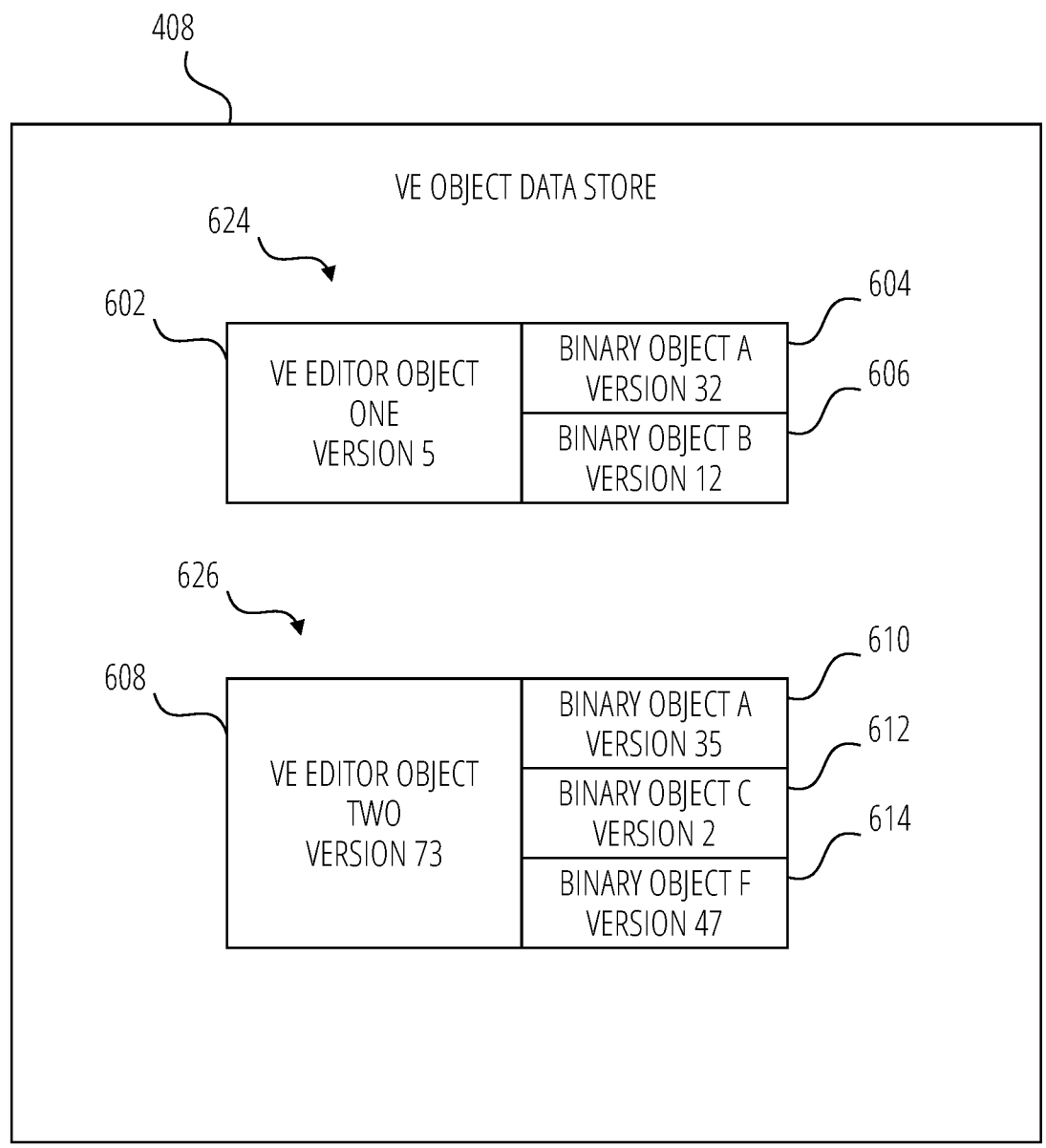
FIG. 6A and FIG. 6B illustrate a non-limiting example embodiment of a versioning scheme supported by the virtual object management computing system according to various aspects of the present disclosure.
Figure 6B:
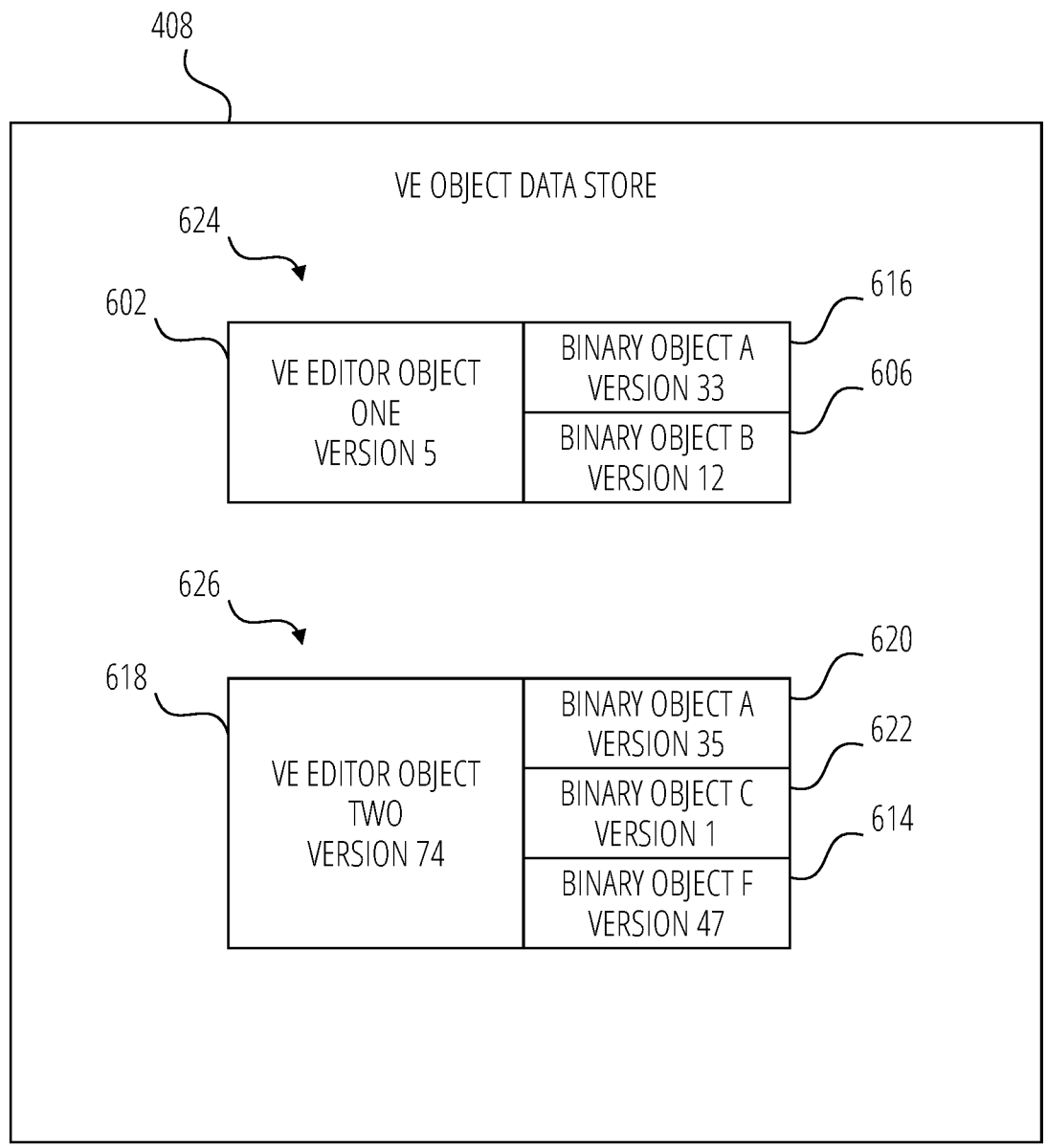

Since edits to a virtual environment object may include edits made on both the virtual environment client computing device 112 and the designer computing device 102, it would be beneficial to be able to identify edits made on either side in order to properly version the overall object. FIG. 6A and FIG. 6B illustrate a non-limiting example embodiment of a versioning scheme supported by the virtual object management computing system 110 according to various aspects of the present disclosure. In the versioning scheme, virtual environment version objects are used to separately track versions of a VE editor object and the binary objects referenced thereby.

As shown, the VE object data store 408 of the virtual object management computing system 110 stores versioning records for virtual environment version object one 624 and virtual environment version object two 626. Though FIG. 6A and FIG. 6B only show the version numbering information to avoid obscuring other features, in some embodiments, the virtual object management computing system 110 may also store the corresponding virtual environment editor objects, referenced binary objects, and studio-version objects associated with the reference binary objects, either in the VE object data store 408, the binary object data store 412, the studio-version object data store 416, or in another location. In some embodiments, the VE object data store 408 may store versioning information for the studio-version objects associated with the binary objects instead of or in addition to the versioning information for the corresponding binary objects.

Each of the virtual environment objects 624, 626 includes a version of an associated VE editor object and the referenced binary objects. Accordingly, virtual environment version object one 624 includes a version of VE editor object one 602 (version 5), and a version of binary object A 604 referenced by virtual environment version object one 624 (version 32) and a version of binary object B 606 referenced by virtual environment version object one 624 (version 12). Likewise, virtual environment version object two 626 includes a version of VE editor object two 608 (version 73), a version of binary object A 610 referenced by virtual environment version object two 626 (version 35), a version of binary object C 612 referenced by virtual environment version object two 626 (version 2), and a version of binary object F 614 referenced by virtual environment version object two 626 (version 47). In some embodiments, a given version of a virtual environment object may be referred to by a combination of all of the version numbers of the component parts. For example, the version of virtual environment version object one 624 illustrated in FIG. 6A may be referred to as "version 5.32.12," with one component of the combined version number referring to each subcomponent of virtual environment version object one 624.

FIG. 6B illustrates updates to virtual environment version object one 624 and virtual environment version object two 626 after various edits have been made. For example, no edits were made to VE editor object one 602 or binary object B 606, but binary object A 616 was updated, and so the version of binary object A 616 has been incremented to version 33. As another example, VE editor object two 618 was edited, and so its version was incremented to version 74, and binary object A 620 referenced by virtual environment version object two 626 was also edited, and so its version was incremented to version 35. Binary object C 622 referenced by virtual environment version object two 626 was rolled back to a previous version, and so its version was decremented back to version 1. No changes were made to binary object F 614.

By tracking the versions of the VE editor object and the referenced binary objects separately, different combinations of versions can be tried. For example, if the positions of the binary objects specified by a given VE editor object are acceptable (i.e., no changes to the VE editor object are needed) but different textures of the binary objects are desired (i.e., a different version of the binary objects is preferred), the versions of the binary objects can be changed to any other version independently of the version of the VE editor object. This also allows different versions of the binary objects to be referenced by different VE editor object, as is shown with virtual environment version object one 624 referencing version 33 of binary object A 616, while virtual environment version object two 626 references version 35 of binary object A 620.

Figure 7A:
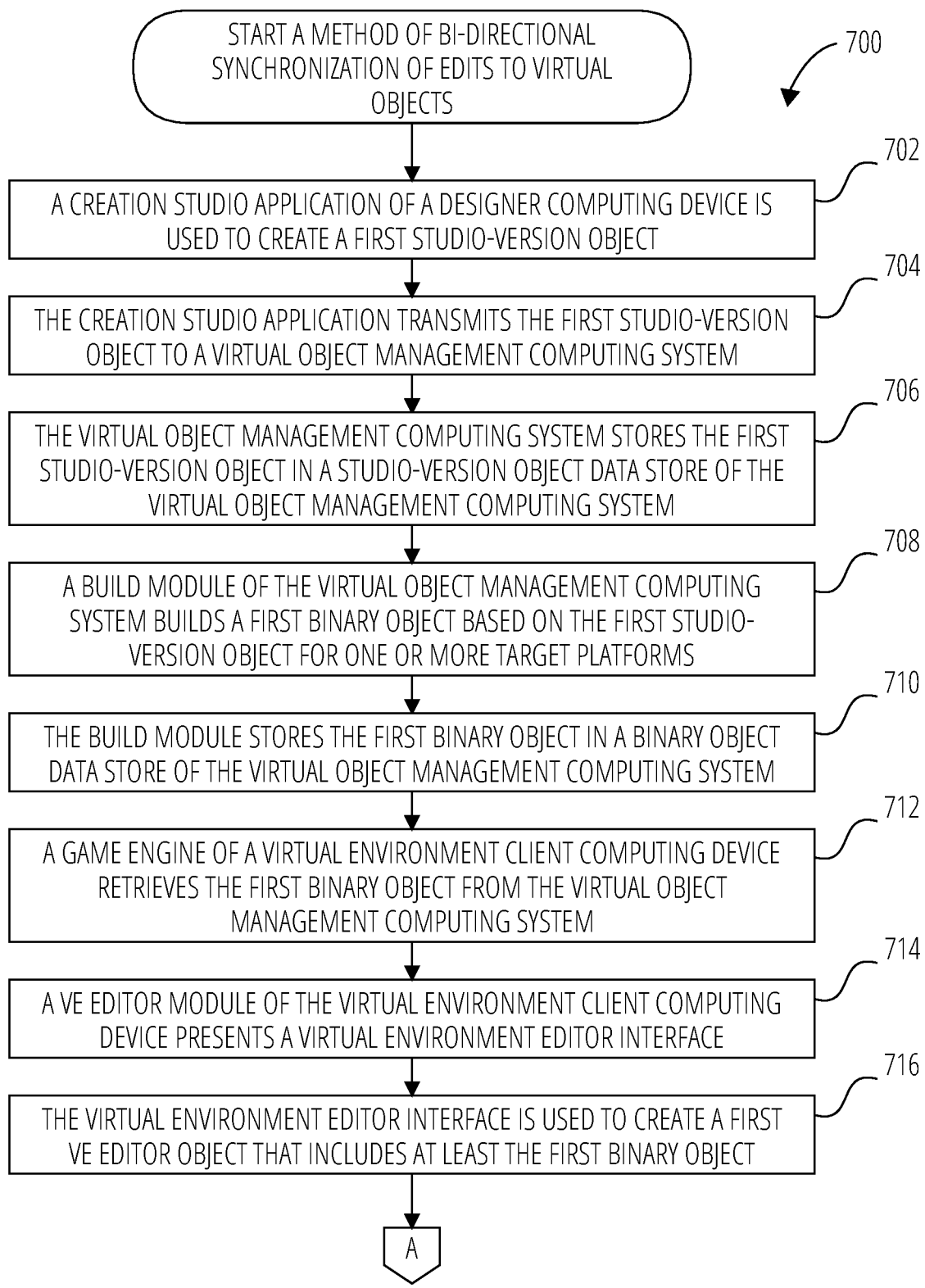
FIG. 7A-FIG. 7C are a flowchart that illustrates a non-limiting example embodiment of a method of bi-directional synchronization of edits to virtual objects according to various aspects of the present disclosure.
Figure 7B:
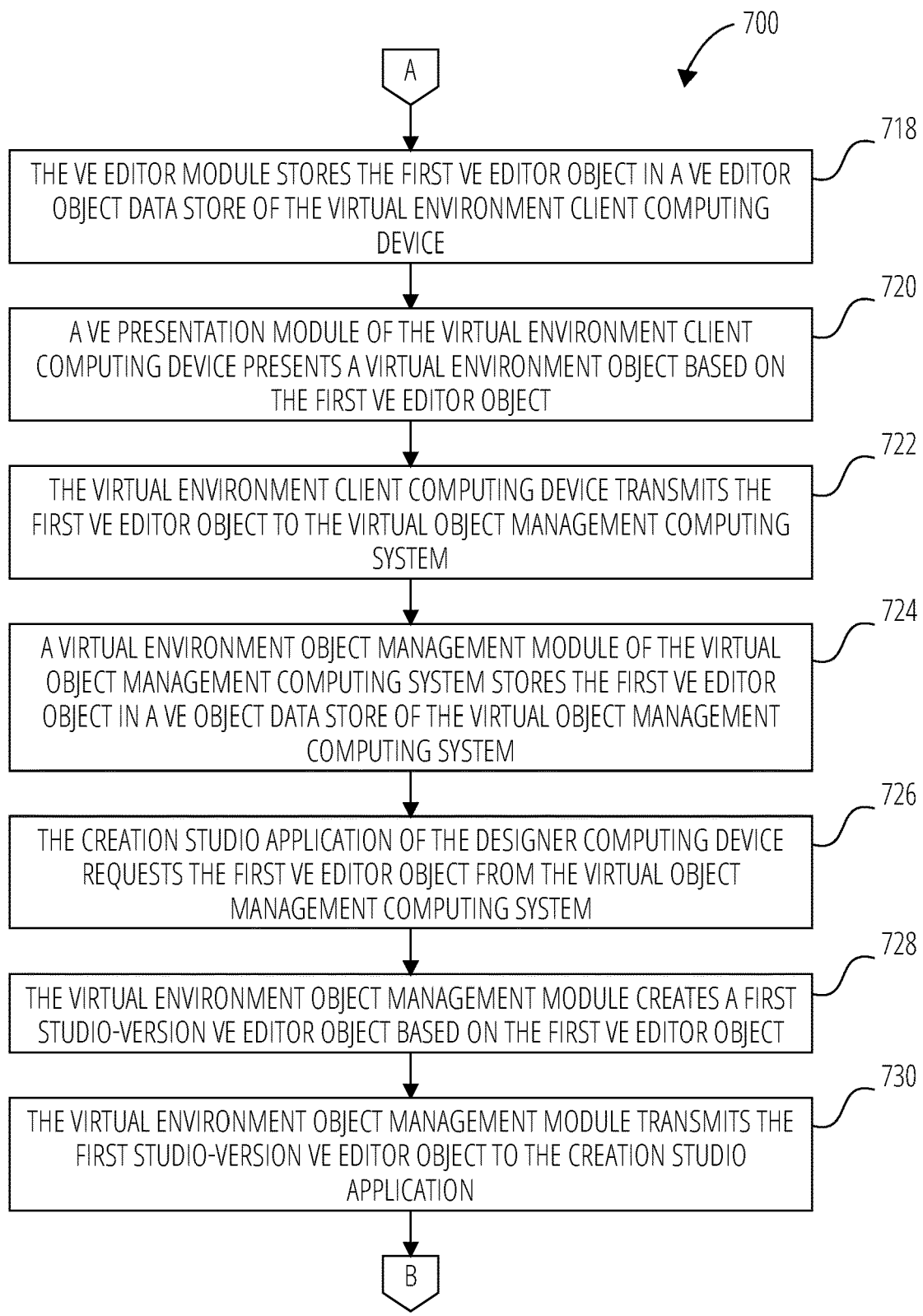
Figure 7C:
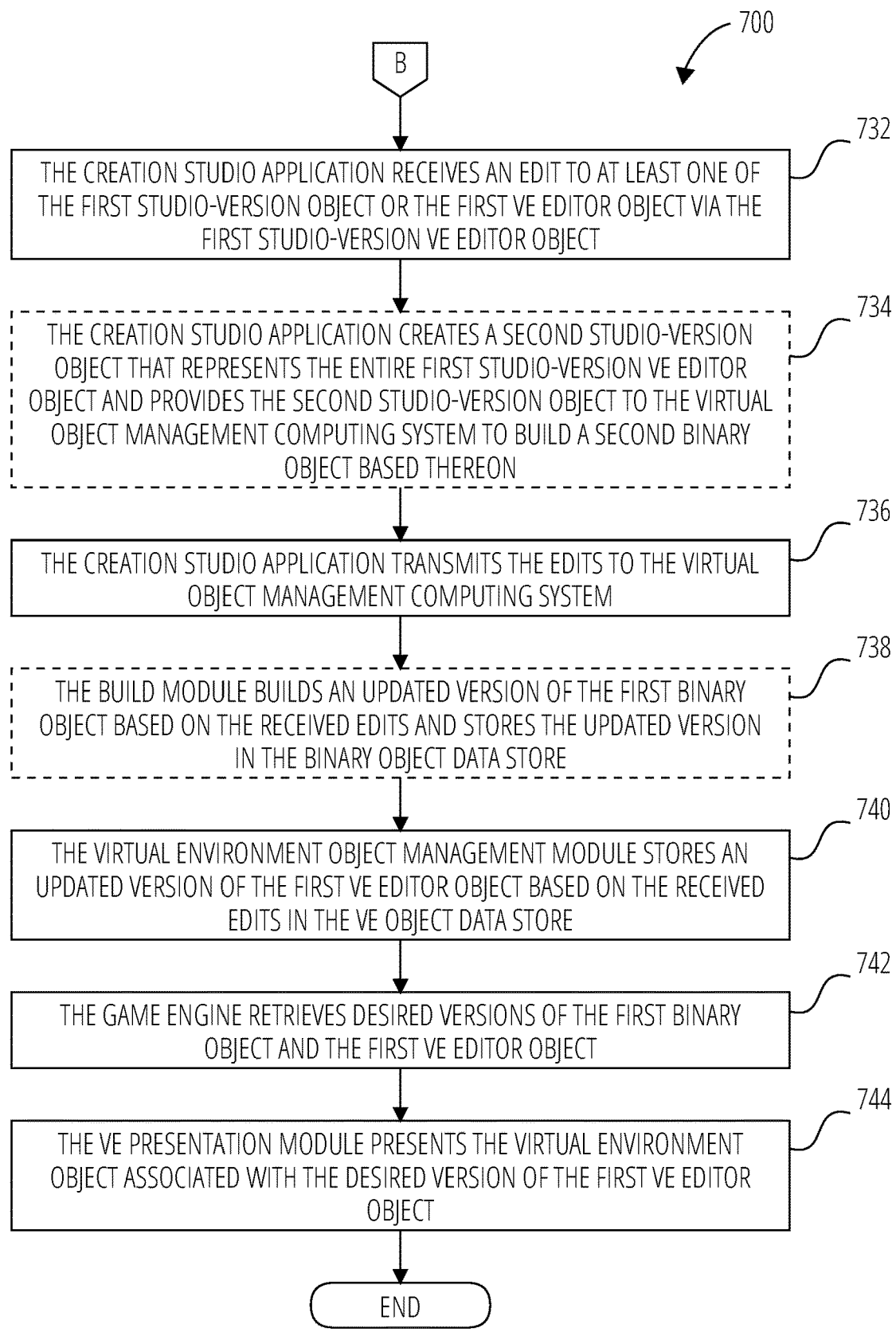

FIG. 7A-FIG. 7C are a flowchart that illustrates a non-limiting example embodiment of a method of bi-directional synchronization of edits to virtual objects according to various aspects of the present disclosure. In the method 700, VE editor objects are created, presented, and updated in a manner similar to that described above with respect to the schematic representations in FIG. 5A-FIG. 5C.

From a start block, the method 700 proceeds to block 702, where a creation studio application 208 of a designer computing device 102 is used to create a first studio-version object. The creation studio application 208 may be used to adjust any of the detailed parameters of the first studio-version object accessible by the creation studio application 208, including but not limited to one or more of a set of vertices; a mesh; a position, location, and/or scale of the studio-version object 502 within a scene; an asset associated with the object (e.g., a texture, an audio file, etc.); a simulated physical property (e.g., collision behaviors, articulations, joints, etc.); a behavioral property (e.g., is this object solid/does this object cause collisions; motion vectors; animations; etc.); a behavior script; or a shader.

At block 704, the creation studio application 208 transmits the first studio-version object to a virtual object management computing system 110, and at block 706, the virtual object management computing system 110 stores the first studio-version object in a studio-version object data store 416 of the virtual object management computing system 110. In some embodiments, the virtual object management computing system 110 may assign a version number to the first studio-version object to be stored along with the first studio-version object.

At block 708, a build module 410 of the virtual object management computing system 110 builds a first binary object based on the first studio-version object for one or more target platforms, and at block 710, the build module 410 stores the first binary object in a binary object data store 412 of the virtual object management computing system 110. In some embodiments, the build module 410 may be configured to support a plurality of target platforms (e.g., desktop platforms including but not limited to Windows, Mac, Linux, etc.; extended reality platforms including but not limited to Meta Quest, PlayStation VR, Hololens, etc.; console platforms including but not limited to Microsoft Xbox, Nintendo Switch, Sony PlayStation, etc.; web platforms including but not limited to WebGL, etc.; and/or other platforms), and may build and store a version of the first binary object for each of the supported target platforms. In some embodiments, the build module 410 may store the first binary object with a version number that matches the version number of the first studio-version object. In some embodiments, the first binary object may have its own version number separate from the version number of the first studio-version object.

At block 712, a game engine 310 of a virtual environment client computing device 112 retrieves the first binary object from the virtual object management computing system 110. In some embodiments, the game engine 310 may search for or otherwise request binary objects from the virtual environment client computing device 112, and the virtual environment client computing device 112 may provide the first binary object in response to the request. In some embodiments, the virtual environment client computing device 112 may push the first binary object to the game engine 310 in response to the first binary object being built by the build module 410.

At block 714, a VE editor module 316 of the virtual environment client computing device 112 presents a virtual environment editor interface. In some embodiments, a user of the virtual environment client computing device 112 that is interacting within the virtual environment may choose to launch the virtual environment editor interface, which is then presented in the virtual environment by the VE editor module 316 within the game engine 310. At block 716, the virtual environment editor interface is used to create a first VE editor object that includes at least the first binary object. In some embodiments, the virtual environment editor interface may be used to select the first binary object from a list of potential binary objects to be added, and to position/scale/otherwise adjust the first binary object in the context of the first VE editor object. In some embodiments, the virtual environment editor interface may provide the option to lock the first binary object to the selected version of the first binary object, or to allow the first binary object to be automatically updated within the first VE editor object if a new version of the first binary object is created by the designer computing device 102 and made available by the virtual object management computing system 110.

The method 700 then proceeds to a continuation terminal ("terminal A"). From terminal A (FIG. 7B), the method 700 proceeds to block 718, where the VE editor module 316 stores the first VE editor object in a VE editor object data store 308 of the virtual environment client computing device 112. In some embodiments, the VE editor module 316 may store a version of the first VE editor object along with versions of each binary object included in the first VE editor object (as illustrated in FIG. 6A and FIG. 6B and described above).

At block 720, a VE presentation module 314 of the virtual environment client computing device 112 presents a virtual environment object based on the first VE editor object. The virtual environment object includes the binary objects referenced by the first VE editor object at the positions/scales/etc. specified by the first VE editor object. In some embodiments, the presentation may include rendering interactive aspects of the binary objects and/or the virtual environment object as a whole.

At block 722, the virtual environment client computing device 112 transmits the first VE editor object to the virtual object management computing system 110. In some embodiments, this may occur in response to the user choosing to share the first VE editor object with other users or otherwise persist the first VE editor object within the system 100. In some embodiments, the VE editor module 316 may automatically transmit the first VE editor object to the virtual object management computing system 110.

At block 724, a virtual environment object management module 414 of the virtual object management computing system 110 stores the first VE editor object in a VE object data store 408 of the virtual object management computing system 110. As discussed above, the first VE editor object is stored with a version number of the first VE editor object as a whole, as well as version numbers of the binary objects that are referenced by the first VE editor object (as illustrated in FIG. 6A and FIG. 6B and discussed in detail above).

At block 726, the creation studio application 208 of the designer computing device 102 requests the first VE editor object from the virtual object management computing system 110. In response, at block 728, the virtual environment object management module 414 creates a first studio-version VE editor object based on the first VE editor object. In order to create the first studio-version VE editor object, the virtual environment object management module 414 determines a version of the first studio-version object that corresponds to the version of the first binary object included in the first VE editor object, retrieves the determined version of the first studio-version object from the studio-version object data store 416, and adds the first studio-version object to the first studio-version VE editor object along with the parameters that were previously applied to the first binary object.

At block 730, the virtual environment object management module 414 transmits the first studio-version VE editor object to the creation studio application 208. The creation studio application 208 may then present the first studio-version VE editor object within its creation interface. The method 700 then proceeds to another continuation terminal ("terminal B").

From terminal B (FIG. 7C), the method 700 proceeds to block 732, where the creation studio application 208 receives an edit to at least one of the first studio-version object or the first VE editor object via the first studio-version VE editor object. Edits to the first studio-version object include changes to detailed parameters (e.g., textures, etc to be applied to the first studio-version object) that are not available within the virtual environment editor. Edits to the first VE editor object include changes to parameters that are available within the virtual environment editor, such as position/scale/etc of the first studio-version object. In some embodiments, the creation studio application 208 may determine whether a given edit is an edit to the first studio-version object or the first VE editor object based on the type of parameter being changed. In some embodiments, the creation studio application 208 may provide separate interface elements (e.g., separate property panels) for properties of the first studio-version object and for properties of the first VE editor object.

As the complexity of VE editor objects increases, their rendering and/or management within the virtual environment editor may become unwieldy. Also, combinations of multiple binary objects in a VE editor object may be desirable to be reused frequently enough that efficiencies could be gained by eliminating the extra layer of indirection introduced by the VE editor object. Accordingly, in some embodiments, the creation studio application 208 may provide an option to flatten a studio-version VE editor object into a single studio-version object, which may then be built into its own stand-alone binary object that may be easily reused. In response to activating such an option, at optional block 734, the creation studio application 208 creates a second studio-version object that represents the entire studio-version VE editor object, and provides the second studio-version object to the virtual object management computing system 110 to build a second binary object based thereon. The second studio-version object includes all of the information (properties such as position/scale/etc.) of the VE editor object, as well as all of the information of each referenced studio-version object. The second studio-version object and the second binary object may then be stored in the studio-version object data store 416 and the binary object data store 412, respectively. The actions of optional block 734 are described as optional because, in some embodiments, the option for flattening studio-version VE editor objects is not provided, and in some embodiments, the designer may choose not to flatten a given studio-version VE editor object even if the option is provided.

At block 736, the creation studio application 208 transmits the edits from block 732 to the virtual object management computing system 110. At optional block 738, the build module 410 builds an updated version of the first binary object based on the received edits and stores the updated version in the binary object data store 412. The actions of optional block 738 are described as optional because if there have been no edits to the first studio-version object, then an updated version of the first binary object is unnecessary, and the actions of optional block 738 may be omitted. If an updated version of the first binary object is created, then the virtual environment object management module 414 may update VE editor objects stored in the VE object data store 408 that have been configured to be automatically updated with new versions of the component binary objects. For example, the virtual environment object management module 414 may update virtual environment version object one 624 to use version 32 of binary object A 604 as illustrated in FIG. 6A to version 33 of binary object A 616 as illustrated in FIG. 6B, even if the edits to the studio-version object corresponding to binary object A 604 were not made specifically in relation to VE editor object one 602.

At block 740, the virtual environment object management module 414 stores an updated version of the first VE editor object based on the received edits in the VE object data store 408. If the edits include changes to the parameters of the first VE editor object, then the updated version of the first VE editor object will include the edited parameters. If the edits included changes to the first studio-version object, then the updated version of the first VE editor object will include a reference to the newly built version of the first binary object. In either case, the virtual environment object management module 414 may update the version number of the first VE editor object stored in the VE object data store 408 (e.g, updating from version 73 of the VE editor object two 608 as shown in FIG. 6A to version 74 of the VE editor object two 618 as shown in FIG. 6B.

Once the edits are stored in the VE object data store 408, at block 742, the game engine 310 retrieves desired versions of the first binary object and the first VE editor object, and at block 744, the VE presentation module 314 presents the virtual environment object associated with the desired version of the first VE editor object. In some embodiments, the specific version of the first binary object referenced by the first VE editor object may be retrieved and presented by the VE presentation module 314, even if a newer version of either the first VE editor object or the first binary object is available, in order to maintain a consistent presentation until a user is ready to update to a newer version. In some embodiments, the VE editor module 316 may present the desired version of the first VE editor object, and may allow the user to adjust which version of the first VE editor object is used, and/or which version of the first binary object is used with the first VE editor object. The VE editor module 316 may be further used to change the first VE editor object, and the changes may be synchronized back to the virtual object management computing system 110 as described above, and the process of bi-directional synchronization of edits between the virtual environment client computing device 112 and the designer computing device 102 may continue any number of times.

The method 700 then proceeds to an end block and terminates.

While illustrative embodiments have been illustrated and described, it will be appreciated that various changes can be made therein without departing from the spirit and scope of the invention. For example, though the system 100 is illustrated as including a designer computing device 102, a virtual environment client computing device 112, and a virtual object management computing system 110, and the method 700 is described as utilizing all of these components, in some embodiments, the functionality of one or more of these devices may be combined into a single computing device or computing system, or split amongst multiple computing devices or computing systems. For example, in some embodiments, the virtual object management computing system 110 may be omitted, and the designer computing device 102 and virtual environment client computing device 112 may communicate directly with each other. In such embodiments, the designer computing device 102 may perform the actions of the virtual object management computing system 110, including but not limited to creating studio-version VE editor objects based on VE editor objects created by virtual environment client computing devices 112, and building/transmitting the binary objects for one or more target platforms.

The embodiments of the invention in which an exclusive property or privilege is claimed are defined as follows:

1. A system, comprising:
   a designer computing device; and
   a virtual environment client computing device;
   wherein the designer computing device is configured to provide a creation studio application in which a designer user can create and modify studio-version objects that can be built into binary objects presentable by a game engine, wherein the creation studio application operates outside of the game engine;
   wherein the virtual environment client computing device is configured to execute the game engine to provide a virtual environment that includes a virtual environment editor in which an end user can create and modify virtual environment editor objects (VE editor objects) that reference binary objects; and
   wherein the designer computing device is further configured to:
      receive a studio-version VE editor object that includes information from a VE editor object created on the virtual environment client computing device and a reference to a binary object;
      determine a studio-version object corresponding to the reference to the binary object; and
      present the studio-version object in the creation studio application in a position and orientation within a scene as indicated by the studio-version VE editor object for editing of the scene.

2. The system of claim 1, wherein the designer computing device is further configured to:
   transmit edits to the VE editor object for presentation by the game engine within the virtual environment on the virtual environment client computing device.

3. The system of claim 1, further comprising a virtual object management computing system configured to:
   receive a second studio-version object from the designer computing device;
   build a second binary object based on the second studio-version object; and
   transmit the second binary object to the virtual environment client computing device.

4. The system of claim 3, wherein the virtual object management computing system is further configured to:
   build the second binary object for a plurality of types of virtual environment client computing devices.

5. The system of claim 3, wherein the virtual object management computing system is further configured to:

store a virtual environment version object that includes a reference to a version of a second VE editor object and at least one reference to a version of a third binary object.

6. The system of claim 1, wherein the virtual environment client computing device includes at least one of a head-mounted augmented reality device, a head-mounted virtual reality device, a desktop computing device, a laptop computing device, a game console, or a smartphone.

7. The system of claim 1, further comprising a plurality of virtual environment client computing devices.

8. The system of claim 7, wherein the plurality of virtual environment client computing devices includes at least one virtual environment client computing device of a first type and at least one virtual environment client computing device of a second type.

9. A computer-implemented method of managing editing of virtual environment objects, the method comprising:
   receiving, by a computing system, a first studio-version object created in a creation studio application executed by a designer computing device, wherein the creation studio application is associated with a game engine, and wherein the creation studio application is executed by the designer computing device outside of the game engine;
   transmitting, by the computing system, a first binary object based on the first studio-version object to a virtual environment client computing device that is configured to execute the game engine to provide a virtual environment;
   receiving, by the computing system, a first VE editor object created in a virtual environment editor presented within the virtual environment by the virtual environment client computing device using the game engine, wherein the first VE editor object includes at least a reference to the first binary object;
   creating, by the computing system, a first studio-version VE editor object that includes at least a reference to the first studio-version object and the first VE editor object; and
   transmitting, by the computing system, the first studio-version VE editor object to the designer computing device.

10. The computer-implemented method of claim 9, wherein the first studio-version object includes one or more of an editable mesh or an editable texture.

11. The computer-implemented method of claim 9, wherein the first VE editor object includes one or more of an editable position for the first binary object, an editable orientation for the first binary object, or an editable interactive behavior setting for the first binary object.

12. The computer-implemented method of claim 9, further comprising building, by the computing system, the first binary object based on the first studio-version object.

13. The computer-implemented method of claim 12, wherein the building of the first binary object based on the first studio-version object includes building the first binary object for a plurality of types of virtual environment client computing devices.

14. The computer-implemented method of claim 9, further comprising:
   receiving, by the computing system, one or more edits to the first studio-version VE editor object, wherein the one or more edits indicate one or more of:
   a change to the first studio-version object;
   a change of a second reference to a second binary object referenced by the first VE editor object; or
   a change of at least one of a position, an orientation, or an interactive behavior setting for a third binary object referenced by the first VE editor object.

15. A non-transitory computer-readable medium having computer-executable instructions stored thereon that, in response to execution by one or more processors of a computing system, cause the computing system to perform actions for managing editing of virtual environment objects, the actions comprising:
   receiving, by the computing system, a first studio-version object created in a creation studio application executed by a designer computing device, wherein the creation studio application is associated with a game engine, and wherein the creation studio application is executed by the designer computing device outside of the game engine;
   transmitting, by the computing system, a first binary object based on the first studio-version object to a virtual environment client computing device that is configured to execute the game engine to provide a virtual environment;
   receiving, by the computing system, a first VE editor object created in a virtual environment editor presented within the virtual environment by the virtual environment client computing device using the game engine, wherein the first VE editor object includes at least a reference to the first binary object;
   creating, by the computing system, a first studio-version VE editor object that includes at least a reference to the first studio-version object and the first VE editor object; and
   transmitting, by the computing system, the first studio-version VE editor object to the designer computing device.

16. The non-transitory computer-readable medium of claim 15, wherein the first studio-version object includes one or more of an editable mesh or an editable texture.

17. The non-transitory computer-readable medium of claim 15, wherein the first VE editor object includes one or more of an editable position for the first binary object, an editable orientation for the first binary object, or an editable interactive behavior setting for the first binary object.

18. The non-transitory computer-readable medium of claim 15, wherein the actions further comprise building, by the computing system, the first binary object based on the first studio-version object.

19. The non-transitory computer-readable medium of claim 18, wherein the building of the first binary object based on the first studio-version object includes building the first binary object for a plurality of types of virtual environment client computing devices.

20. The non-transitory computer-readable medium of claim 15, wherein the actions further comprise:
   receiving, by the computing system, one or more edits to the first studio-version VE editor object, wherein the one or more edits indicate one or more of:
   a change to the first studio-version object;
   a change of a second reference to a second binary object referenced by the first VE editor object; or
   a change of at least one of a position, an orientation, or an interactive behavior setting for a third binary object referenced by the first VE editor object.

* * * * *